F. Schleifer,
Vinegar App$.
No. 93,012. Patented July 27, 1869.
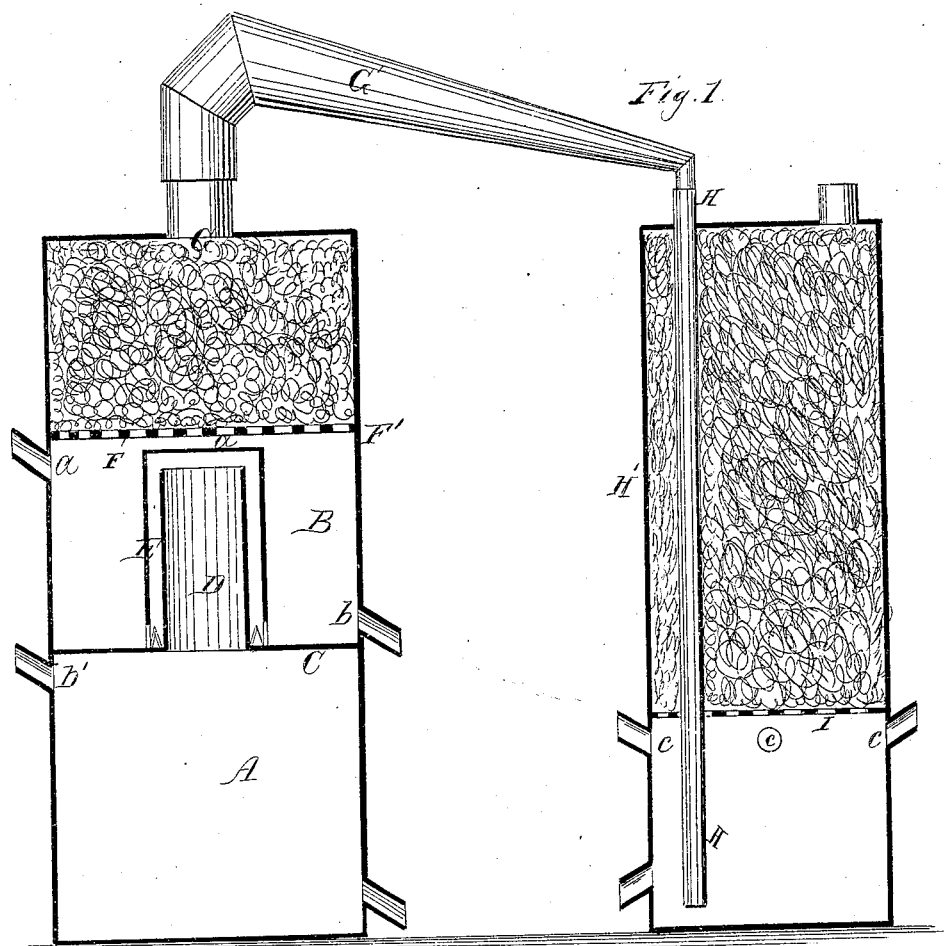
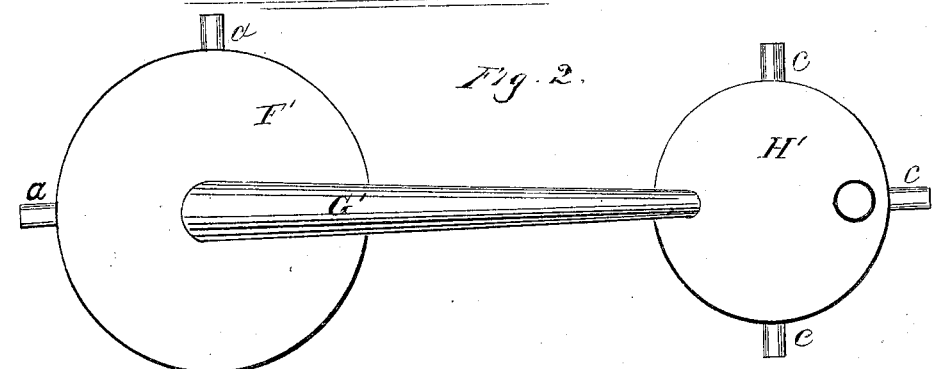
Witnesses.
Geo. H. Strong
J. L. Boone
Inventor.
Francis Schleifer
by his attorney,
Dewey & Co

United States Patent Office.

FRANCIS SCHLEIFER, OF SAN FRANCISCO, CALIFORNIA, ASSIGNOR TO HIMSELF AND FRANCIS CUTTING.

Letters Patent No. 93,012, dated July 27, 1869; antedated July 16, 1869.

IMPROVED METHOD OF MANUFACTURING VINEGAR.

The Schedule referred to in these Letters Patent and making part of the same.

*To all whom it may concern:*

Be it known that I, FRANCIS SCHLEIFER, of the city and county of San Francisco, State of California, have invented an Improved Method of Manufacturing Vinegars; and I do hereby declare the following description and accompanying drawings are sufficient to enable any person skilled in the art or science to which it most nearly appertains, to make and use my said invention or improvements without further invention or experiment.

My invention consists in mingling, with alcoholic and vinegar-vapors, oxygen in sufficient quantities to produce acetification rapidly, whereby the conditions under which vinegar is obtained are more profitable than by the common method or process.

In order to more fully illustrate and describe my method of manufacturing vinegar, reference is had to the accompanying drawing and letters marked thereon, forming a part of this specification, of which—

Figure 1 is a sectional elevation of fig. 2, cut longitudinally.

Figure 2 is a plan or top view.

A represents a compartment for the diluted alcohol or fermented liquor.

Another compartment, B, in which vinegar is placed, is situated above the first, A, the two being separated by a diaphragm, C, through which a pipe, D, passes.

A cap, E, larger than the pipe, D, is placed over it, and is attached to the diaphragm, leaving notched openings around its base.

The vinegar compartment is divided by a perforated bottom, F, making a third compartment, in which is placed a quantity of shavings, which are saturated with vinegar, say, from thirty (30) to forty (40) gallons, or with a sufficient quantity for the capacity of the generator F'.

The generator is provided with suitable openings *a a a* and *b b b*, through which to introduce and draw off the liquid, as desired.

A pipe, *b'*, also leads into the compartment A, for admitting a quantity of air sufficient for acetifying-purposes, which is to be injected by a blower or other suitable device, and regulated by an adjustable stop.

At the top of the generator F' is an opening, G, from which a pipe, G', connects with a vertical pipe, H, which extends to near the bottom of an acetifier, H', placed near the generator.

In this acetifier are also placed shavings saturated with vinegar, which fill it from the top to near the bottom, resting on a perforated bottom, I, leaving a considerable space beneath, into which lower apartment lead air-tubes *c c c c*.

In the acetifier H' are also placed from one to two hundred gallons of vinegar, more or less, according to its capacity.

In performing my operations or process, the air-tubes in the acetifier are closed, and heat or steam applied under or around the compartment A of the generator, which causes the vapors to ascend up into the saturated shavings above, carrying with it the air which is being impelled through the pipe *b'*, mingling with the vinegar in the acetifier above, and converting it also into vapor, from whence it passes up into the shavings above, and into the pipe leading into the acetifier; whence it passes down as vapor, through the vertical pipe H, into the liquid vinegar in the compartment below, converting the vinegar in the said compartment into vapor also, which is conveyed through pipes into other acetifiers similar to that last described, and from thence to standers as vinegar.

When two of the acetifiers are employed beside the generator, about twenty-five per cent. of the alcohol contained in the fomented mash, or diluted alcohol, is converted into vinegar at once, and the remainder is brought into such a condition that it is converted into vinegar in a much shorter time than by the old process, while by employing more acetifiers the remaining alcohol can be converted into vinegar.

Having thus described my invention,

What I claim, and desire to secure by Letters Patent, is—

1. Mingling oxygen with a vapor intended to be acetified before the same is condensed by injecting atmospheric air, or the prepared gas into the vessel or compartment in which the vapor is generated, substantially as described.

2. The generator F', consisting of the compartment A, provided with the air-injection pipe *b'*, and the compartment B, divided by the perforated plate F, and provided with the pipe D and cap E, the whole being constructed and arranged substantially as and for the purposes set forth.

3. In combination with the generator F', the acetifier H, one or more, for completing the process of acetification, substantially as described.

In witness whereof, I have hereunto set my hand and seal.

FRANCIS SCHLEIFER. [L. S.]

Witnesses:
GEO. H. STRONG,
J. L. BOONE.